Oct. 17, 1950     J. Y. DUNBAR     2,525,782
SHOCK WAVE TRAP FOR MULTIPLE COMBUSTION
CHAMBER RESO-JET MOTORS
Filed Aug. 2, 1945
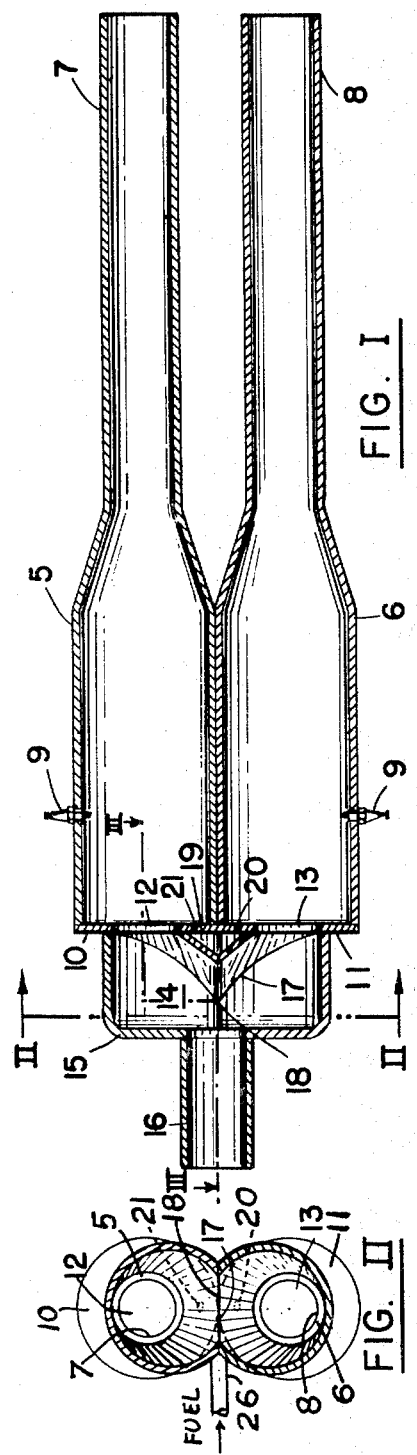
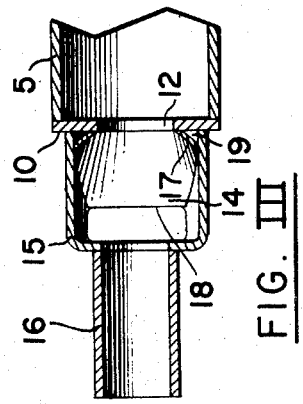
INVENTOR
JAMES Y. DUNBAR
ATTORNEY Patented Oct. 17, 1950

2,525,782

UNITED STATES PATENT OFFICE 2,525,782

SHOCK WAVE TRAP FOR MULTIPLE COMBUSTION CHAMBER RESO-JET MOTORS

James Y. Dunbar, United States Navy

Application August 2, 1945, Serial No. 608,543

6 Claims. (Cl. 60—35.6)

(Granted under the act of March 3, 1883, as amended April 30, 1928; 370 O. G. 757)

This invention relates to improvements in reso-jet motors and is particularly directed to the combustion chamber of said motors.

An object of this invention is to provide a reso-jet motor that has an increased efficiency.

Another object of this invention is to provide a reso-jet motor that has a shock wave trap adapted to give an increased compression to the gases in the combustion chambers of the said motor.

Other objects and advantages of this invention will become apparent as the discussion proceeds and is considered in connection with the accompanying claims and drawing wherein like characters of reference designate like parts throughout, and wherein:

Fig. I is a cross-sectional view of the motor embodied in this invention;

Fig. II is a sectional view of the shock wave trap embodied in this invention taken on the lines II—II of Fig. I; and Fig. III is a sectional view taken on the line III—III of Fig. I.

Referring now to the drawing, wherein for the purpose of illustration is shown a preferred embodiment of this invention, the numerals 5 and 6 designate combustion chambers of a dual reso-jet motor, having resonant exhaust tubes 7 and 8. The numeral 9 designates spark plugs provided in both chambers which are used for the initial firing of these chambers. The subsequent charges in both chambers are fired from the flash-back in the resonant exhaust tubes from the preceding charge in each of the chambers. The chambers 5 and 6 are provided with end coverings or plates 10 and 11, respectively. In each of the said end plates are provided air-inlet openings 12 and 13, positioned approximately as shown, and smaller in cross sectional area than either exhaust tubes 7 or 8.

A shock wave trap chamber 14, formed by a case or housing 15 is affixed in any suitable manner, such as by welding or the like, to the said end plates 10 and 11. The chamber 14 includes, and permits open communication between, both of the openings 12 and 13. It is to be noted that due to the pressure under which the chamber 14 operates, the connection between the housing 15 and the end plates 10 and 11 must be pressure-tight. An air-intake 16 is provided in and communicating with the housing 15, as shown. It is to be further noted here that the structure, shown for the purpose of illustration only, is a "valveless type reso-jet motor." A motor having valves of the vibrating or synchronously-controlled mechanical rotary type could be used, in connection with the wave trap embodied in this invention, to the same advantage as the valveless type. If valves are used they would be included in the air-intake 16 in the conventional manner.

A double-curved baffle 17, affixed to the plates 10 and 11, is provided in the chamber 14, as shown. The said baffle 17 divides the chamber 14 into semi-chambers and partially surrounds each of the openings 12 and 13. A bridge 18, formed by the baffle 17, at its point of contact with the end plates 10 and 11, forms a passage 19. Fuel for the chambers 5 and 6 enters openings 20 and 21 through the said passage 19, which is supplied with fuel by any well known means, such as the fuel line 26. The passage 19 may be omitted from the structure, and fuel admitted to the chambers in any conventional manner desired, without departing from the spirit of this invention.

In operation, the chambers 5 and 6 are phased to fire alternately. The charges in each of the chambers are initially exploded from the spark plugs 9, and the resulting flame front from these explosions initially fires the subsequent charges. Expanding gases from the explosion occurring in one chamber move outward through the exhaust tube or tail pipes 7 or 8 of each chamber and, likewise, simultaneously back through the openings 12 or 13, to divert the incoming air to the other chamber. Less gas, and consequently less pressure, will pass through the openings 12 and 13 than through the tail pipes 7 and 8 because of the difference in cross-sectional area of the respective openings in the exhaust tubes and the openings, and further because of the internal surface contours of chambers 5 and 6 and further again because of the difference of acoustical inertia between the tailpipe and the air intake 16. It is to be here noted that no specific size for the openings 12 and 13 is recommended in this specification, because the size of the openings will vary according to the structural design of the motor. However, as pointed out above, these openings, 12 and 13, will always be less in cross-sectional area than the tail pipes but each should be of the same size as the air-inlet 16.

A high pressure wave front of gas, excited into motion as the result of the explosion in the chamber 5, moves out the exhaust tube 7 and the opening 12 into the shock wave trap chamber 14, is turned downward 90 degrees by the concave corner to the rear of said trap. The impact of the moving gas striking this corner dissipates the energy from the wave front and translates it into forward thrust on the motor. The wave front then, under a lessened velocity, moves on downward past the intake passage 16, diverting all of the incoming air to the other chamber 6, which at this time is approaching the end of the low pressure phase of its cycle, and is preparing to enter the compression phase of its cycle. As the incoming air from the passage 16 is diverted to the chamber 6, the pressure is increased by the remaining energy from the wave front, and is carried on into chamber 6 under this increased pressure, and acts as a resisting piston to the wave front returning from the resonant exhaust tube 8. The result is that the combined pressures, i. e., the pressure of the incoming air through the opening 13 and the pressure from the resonant wave front of the exhaust tube 8, gives a higher compression of air, in the chamber 6, just prior to the explosion phase of the cycle of this chamber than the air would have if the compression were from the resonant wave front alone. Consequently an increased efficiency of the exploding fuel and air in this chamber will result. As the explosion occurs in chamber 6, the cycle is reversed and the fuel-air compression in chamber 5 is increased.

It is to be understood that the form of this invention herein shown and described is to be taken as a preferred example of the same, and that various changes in shape, size and arrangement of parts may be resorted to without departing from the spirit of this invention or the scope of the apparent claims.

The invention described herein may be manufactured and used by or for the Government of the United States of America for governmental purposes without the payment of any royalties thereon or therefor.

What is claimed is:

1. A reso-jet motor comprising a combustion means having an air inlet and discharge nozzle means in combination with a shock wave trap communicating with the said combustion means by two eccentrically located ports at one end and with the air inlet by a central port at the other, and having baffles for directing air from the air inlet and gases from one of said eccentrically located ports into said other eccentrically located port.

2. A reso-jet motor comprising a plurality of combustion chambers phased to fire alternately, and a shock wave trap communicating with the said combustion chambers solely at the intake ends thereof and having baffles for directing a portion of the explosion gases alternately from each one of said chambers through said wave trap into the other chamber for raising the pressure therein at a time when said chamber has a return wave from the previous explosion causing a compression of the charge therein.

3. A reso-jet motor comprising combustion chambers each having an air-inlet opening, a housing forming a shock wave trap affixed to the said combustion chambers communicating with the said air-inlet openings, an air-inlet affixed to the said housing, and a baffle within the said housing disposed between the air-inlet openings of the said combustion chambers for directing the air from said air inlet in the housing into said combustion chamber air-inlet openings.

4. A reso-jet motor comprising two combustion chambers phased to fire alternately, air-intake openings in the said chambers, and a shock wave trap communicating with the said openings having an inlet for incoming air charges and baffle means cooperating with said wave trap to direct gas from one chamber escaping through the corresponding air intake opening during the combustion cycle to drive an incoming air charge into the other chamber through its intake opening.

5. A reso-jet motor comprising cooperating combustion chambers phased to fire 180 degrees apart, air-inlet openings provided in the said combustion chambers, an additional chamber communicating with all the said air-inlet openings carrying air-inlet means, and a baffle in the said additional chamber, said baffle being so formed as to direct the passage of gas under pressure from one of the said combustion chambers during explosion passing through said air inlet means into another combustion chamber phased 180° therefrom creating a low pressure area at the said air inlet means diverting air into said other combustion chamber and forcing the said air into said other combustion chamber under pressure just prior to the explosion of the charge in said other combustion chamber.

6. A reso-jet motor comprising a pair of parallel combustion chambers, each having an air inlet port and a tail pipe, a housing forming a shock wave trap forwardly of and communicating with said air inlet ports, an air inlet affixed to the forward end of said housing, and a baffle within said housing disposed between the air inlet ports and directing the air from said housing air inlet into said ports.

JAMES Y. DUNBAR.

REFERENCES CITED

The following references are of record in the file of this patent:

UNITED STATES PATENTS

| Number | Name | Date |
|---|---|---|
| 1,801,007 | Jezler | Apr. 14, 1931 |
| 2,503,584 | Lipkowski | Apr. 11, 1950 |

FOREIGN PATENTS

| Number | Country | Date |
|---|---|---|
| 412,478 | France | May 3, 1910 |